May 10, 1927.
C. S. WORTH
PISTON
Filed Dec. 1, 1924
1,628,097
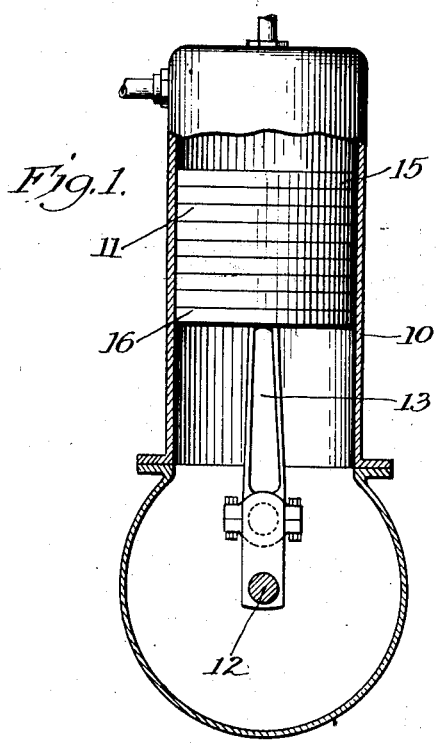
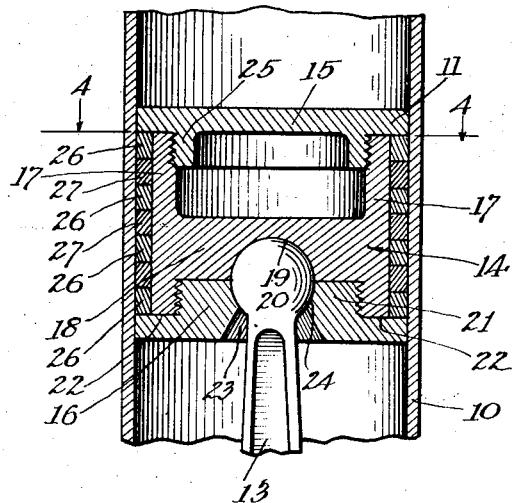
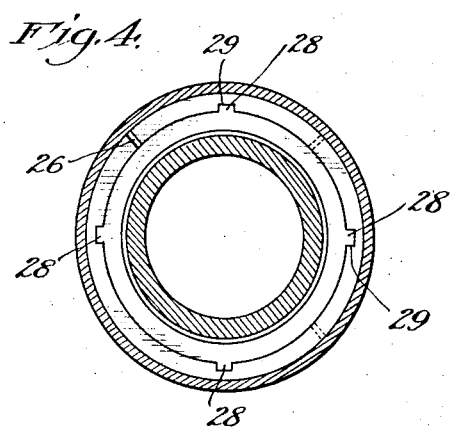
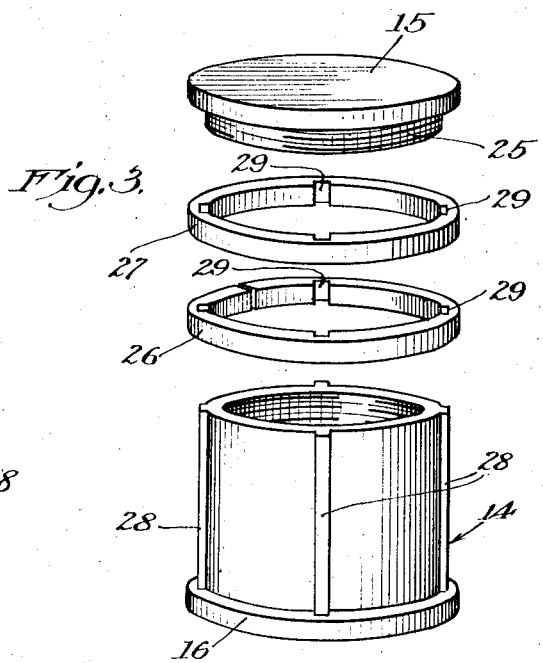
Inventor:
Clemens S. Worth
by
Attorney Patented May 10, 1927.

1,628,097

UNITED STATES PATENT OFFICE.

CLEMENS S. WORTH, OF LOS ANGELES, CALIFORNIA, ASSIGNOR, BY MESNE ASSIGNMENTS, TO EDWARD G. BURGHARD.

PISTON.

Application filed December 1, 1924. Serial No. 753,012.

This invention relates to pistons adapted for use in fluid pressure pumps, engines and the like, but it is particularly efficacious in heavy duty pumps or compressors where a maximum sealing is desired with a minimum of frictional resistance.

The foremost object of my invention is the provision of a piston—which may be properly termed a built up piston—in which the sealing rings may be very easily applied or replaced and which also, due to their particular arrangement, provide a maximum sealing effect.

Another feature of my invention is the elimination of the usual wrist pin construction and the substitution of a ball and socket connection between the piston and connecting rod, rendering the device self-aligning.

The details of construction and operation of my invention are more fully set forth in the following specification, reference being made therein to the accompanying drawings, in which:

Fig. 1 is a transverse vertical sectional view through a typical engine or compressor showing the invention in use;

Fig. 2 is an enlarged fragmentary transverse vertical section through the piston and cylinder;

Fig. 3 is a perspective view illustrating the manner of assembling the piston; and Fig. 4 is a sectional plan view taken as indicated by the line 4—4 of Fig. 2.

Before proceeding to a detailed disclosure of the several features of my invention, I may here note that in practice when a piston is first assembled in a cylinder, that is, the usual type of piston and sealing rings, it is necessary to operate the mechanism for a considerable period of time to wear the inner walls of the cylinder down, as well as the piston and rings, to where they work efficiently. Then, after further operation, the piston and rings become worn and more or less loose in the cylinder, very often to the extent of necessitating entirely new pistons and rings in order to obtain the proper fit. This also very often necessitates re-boring the cylinder. With my present construction I overcome these objectionable features by providing a piston built up almost entirely of sealing rings and spacers, so that, as the piston, as a whole, becomes worn during operation, it may be substantially entirely replaced as needed, merely by the replacement of these rings and spacers, thereby obviating the necessity of replacing the whole piston. Also, with this invention, when the piston is first adjusted to the cylinder, a minimum number of sealing rings may be used with a greater number of spacing rings, and as time goes on and these parts become worn the spacing rings may be replaced by a greater number of sealing rings; thereby effecting the desired results with a minimum of time and expense and without the replacement of an entirely new piston.

Referring now to the drawings the numeral 10 designates generally the cylinder of a typical internal combustion engine, pump or compressor in which my piston 11 is reciprocally mounted and connected to the main shaft 12 by the usual connecting rod 13.

The piston 11 is built up of a body portion 14 with a top 15 and a bottom 16, comprising its principal elements. The body portion 14 is in the form of a cylinder the wall 17 of which extends above and below an intermediate wall or partition 18. A semi-spherical recess 19 is formed in the center of the bottom face of the partition 18 providing the upper portion of a socket for the ball joint 20 on the upper end of the connecting rod 13. The bottom 16 is substantially disk-shaped having a reduced neck portion 21, externally screw threaded for connection within the lower end of the body portion 14. This forms a shoulder 22 which abuts against the lower end of the wall 17 and overhangs its periphery. A conical shaped aperture 23 is cut in the center of the bottom 16 and this terminates in complementary spherical portions 24 which form the other portion of the socket for retaining the ball 20 in place. Thus the bottom 16 performs two functions, that of retaining the piston on the connecting rod and also supporting the piston rings, to which I will presently advert.

The top 15 consists of a flat disk on the bottom of which is an annular flange 25, externally screw threaded to form a juncture within the upper end of body portion 14, as shown. The top 15 also overhangs the periphery of the wall 17 so an annular recess is formed between it and the bottom 16 for retaining the rings in place.

The rings I utilize will preferably be of two kinds, i. e. split sealing rings 26 and non-split spacing rings 27. Under ordinary circumstances these rings will be alternated in the construction, but as above stated, this arrangement may be varied to suit particular conditions. That is, any number of rings may be utilized and when the construction is new more spacing rings used than sealing rings, but as these become worn spacing rings may be replaced by a number of sealing rings required for efficient operation. Preferably the spacing rings will be cut to fit closely over the periphery of the body portion 14 and non-expansible while the sealing rings 26 will be of the usual split, spring type.

In order that the splits in the rings 27 will be held in staggered relation I prefer to form longitudinally extending peripheral ribs 28 on the body portion 14 and also cut complementary recesses 29 in the inner faces of the rings 26 and 27 to engage thereover. Four of these ribs are provided and a like number of complementary recesses cut in the rings, properly spaced, so the severing ends of the rings 26 may be placed at different points around the periphery of the body portion 14.

In assembling the ball 20 of the connecting rod 13 is first seated in the recess 19 and the bottom 16 slipped over it and secured into place. For this purpose the aperture 23 in the bottom 16 may be made large enough to slip over the large end of the connecting rod or it may be made in two parts, which will be properly held together when screwed into place. The rings 26 and 27 are then slipped over the wall 17, alternated or arranged in any manner to suit the particular case, after which the top 15 is tightly screwed in place. For removal or rearrangement of the rings only the top 15 need be removed.

If the usual type of wrist pin construction is used the overhanging flange at the bottom may be formed integral with the body portion and only the top 15 made removable.

While I have herein shown and described the preferred specific embodiment of my invention, it is nevertheless to be understood that I reserve the right to make changes or modifications in structures and arrangement as are permitted within the scope of the appended claim.

Having described a preferred form of my invention, I claim:

A piston comprising a body portion, consisting of cylindrical walls and an intermediate transverse partition, a semi-spherical recess in the bottom face of the partition to form a seat for the ball end of a connecting rod, a bottom removably engaging the body portion and overhanging the periphery thereof to form a peripheral flange thereon, said bottom also having a central aperture therein through which the connecting rod extends, the perimeter of which is adapted to engage the ball thereon to hold it in said seat, a disk-like top for the body portion, removably secured thereto, and overhanging the periphery thereof to form a peripheral flange therearound, and a plurality of sealing and spacing rings removably retained around the body portion comprising the major portion of the cylinder engaging portion of the piston.

In witness that I claim the foregoing I have hereunto subscribed my name this 14th day of October, 1924.

CLEMENS S. WORTH.